March 4, 1941.   L. D. NILSON   2,233,745
JACK STRUCTURE
Filed Feb. 27, 1939   4 Sheets-Sheet 1
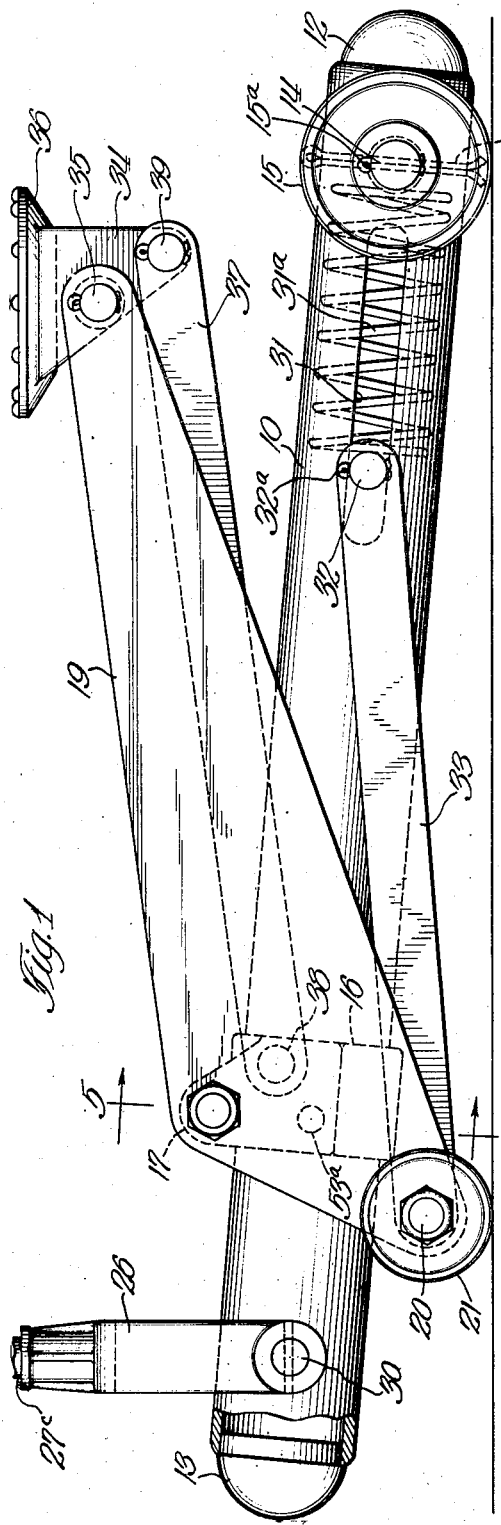
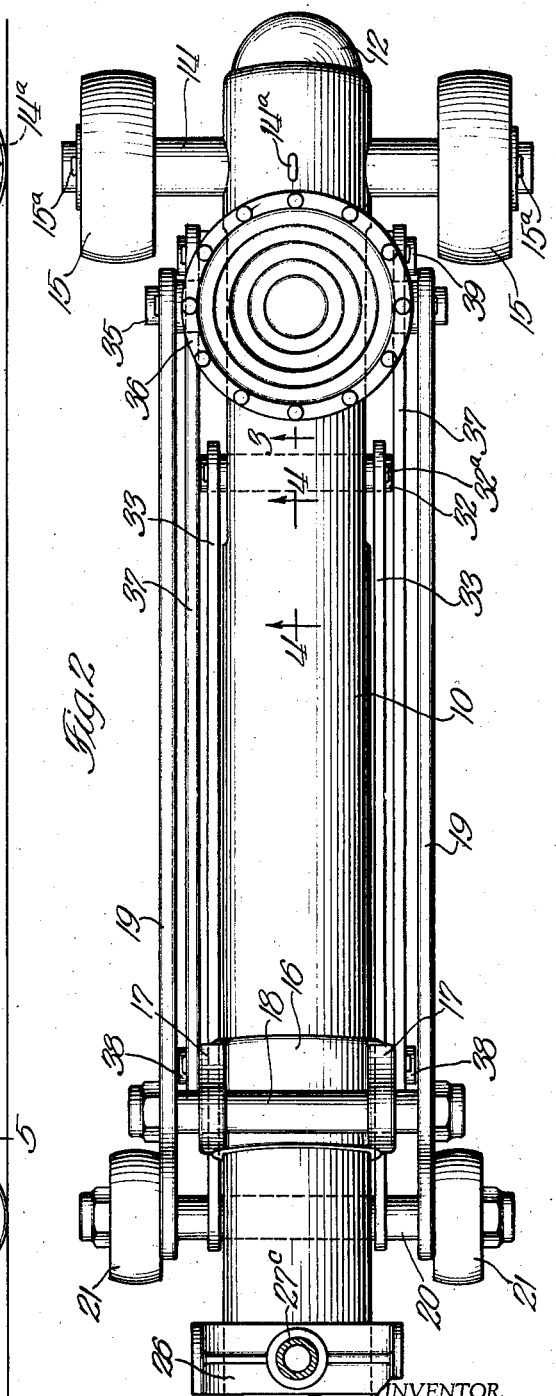
INVENTOR.
Leonard D. Nilson
BY Bair & Freeman
ATTORNEYS

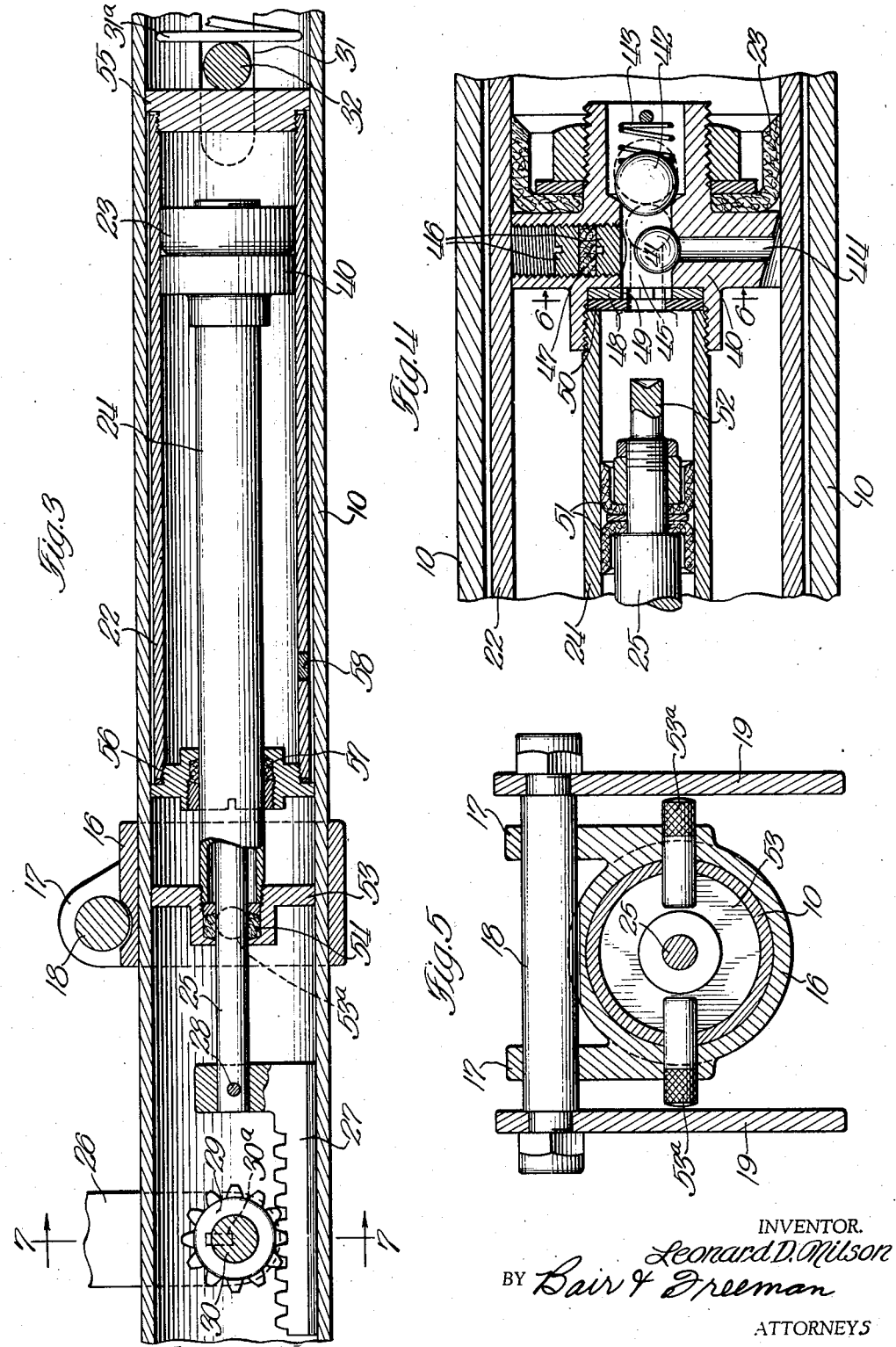

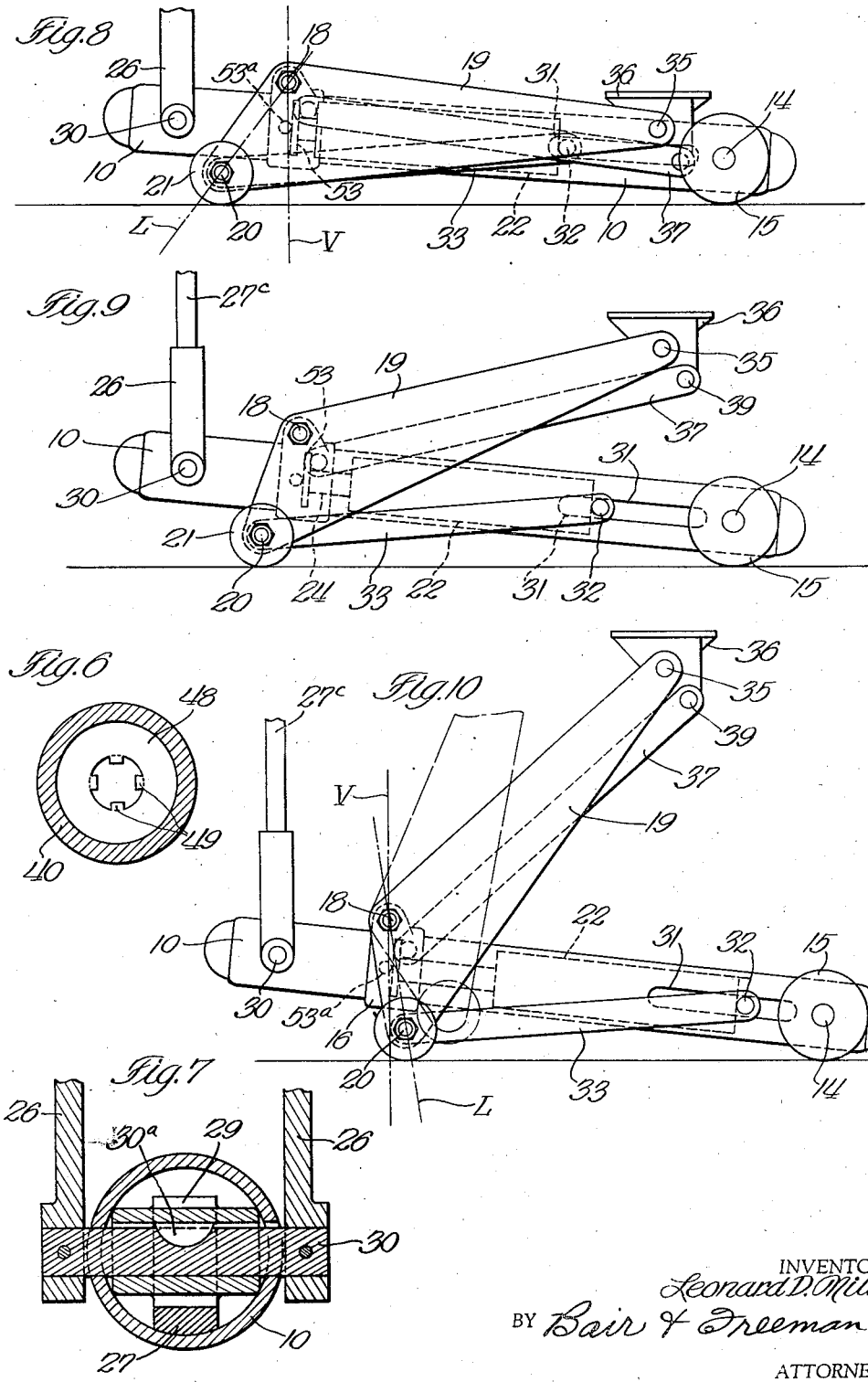

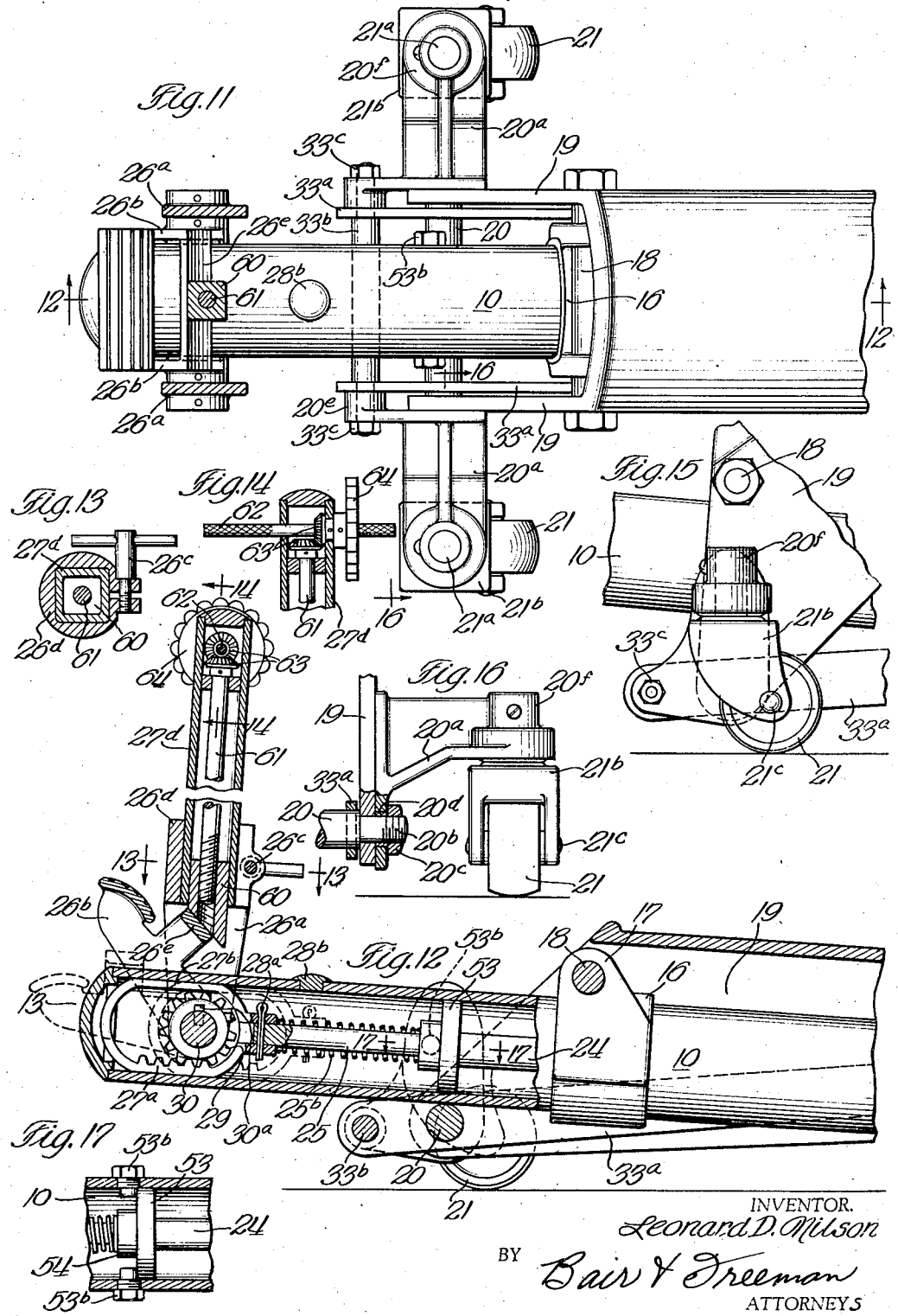

Patented Mar. 4, 1941

2,233,745

UNITED STATES PATENT OFFICE 2,233,745

JACK STRUCTURE

Leonard D. Nilson, Wayzata, Minn., assignor to Vulcan Manufacturing Co., Inc., St. Paul, Minn., a corporation of Minnesota Application February 27, 1939, Serial No. 258,779

26 Claims. (Cl. 254—2)

An object of my present invention is to provide a jack structure in which an elongated body member is wheel-mounted at one end and has a lifting arm pivoted thereto which arm is also wheel-mounted, whereby the body and lifting arm together with the wheels cooperate to support and elevate an automobile or truck axle or the like.

A further object is to pivot the lifting arm to the body member and then have the lifting arm wheel-mounted so that during the lifting operation the wheel mounting swings in such manner relative to the pivot point that the pivot point is raised and thereby maximum lift is imparted to the lifting arm with a minimum of length in the operating parts and with a motion that drops the pivot point and thereby reduces the overall height of the jack when in lowered position.

Another object is to provide a jack structure in which the body member is tubular and a hydraulic extension unit is removable with relation to the body member so that it can be removed and another one inserted when anything goes wrong with the unit, there being removable abutment pins to permit of such removal of the unit when desired in a minimum of time, and the abutment pins being normally retained in position by the lifting arms at the side of the jack structure.

Another object is to provide the hydraulic extension unit of very simple construction and including pump mechanism which is readily connectible with the operating lever pivoted to the body member of the jack.

Still another object is to provide a modified jack structure in which the wheel of the lifting arm is castered so that the jack can be readily steered when transporting it from one position to another, and the bracket mounting for the castered wheel being so designed and related to the lifting arm and to a power link therefor that the link serves to maintain the swivel axis of the caster substantially vertical throughout the movement of the lifting arm between raised and lowered positions.

A further object is to provide an operating means for the pump of a hydraulic extension unit which includes both a foot pedal and a hand operated lever, there being a novel and adjustable operative connection between the hand operated lever and the foot pedal so that for a given movement of the foot pedal various degrees of movement at different angles of the hand lever may be had for operating the jack.

The foregoing, other and further objects of the invention with respect to its novel and patentable features will be apparent from the following description, accompanying drawings and appended claims. For a better detailed understanding of the invention, reference is made to the following description and to the drawings, in which Figure 1 is a side elevation partly in section of my jack structure showing the lifting arm partially raised;

Figure 2 is a plan view thereof, with the operating lever shown in section;

Figure 3 is an enlarged sectional view on the line 3—3 of Figure 2 showing the hydraulic extension unit within the body member of the jack and the operative connection between the operating lever and the pump mechanism of the jack structure;

Figure 4 is a more greatly enlarged sectional view on the line 4—4 of Figure 2, showing the pump mechanism and the construction of the lifting piston of my jack structure;

Figure 5 is a sectional view on the line 5—5 of Figure 1 showing the removable abutment pins against which the hydraulic extension unit engages during the lifting movement of the jack;

Figure 6 is a sectional view on the line 6—6 of Figure 4 showing a washer of the pump mechanism for retaining an intake check valve against accidental dislocation;

Figure 7 is a sectional view on the line 7—7 of Figure 3, showing the rack and pinion connection between the lever and the pump mechanism of the jack;

Figures 8, 9 and 10 are diagrammatic side views showing the extreme lowered position and intermediate position of the jack resulting from operation of the hydraulic extension unit between its limits, with a dash line position shown in Figure 10 of the position the parts assume when removing abutment pins of the structure;

Figure 11 is a plan view of the front portion of the jack showing a modified construction using swiveled or castered wheels and a slightly different operating mechanism for the hydraulic extension unit of my jack;

Figure 12 is a sectional view thereof on the line 12—12 of Figure 11;

Figures 13 and 14 are sectional views on the lines 13—13 and 14—14, respectively, of Figure 12 showing details of construction;

Figure 15 is a side elevation of the near side caster wheel shown in plan view in Figure 11;

Figure 16 is a front view thereof as taken on the line 16—16 of Figure 11, and

Figure 17 is a sectional view on the line 17—17 of Figure 12.

Referring to Figures 1 to 10 on the accompanying drawings, I have used the reference numeral 10 to indicate a tubular elongated body member. It is closed at its ends by caps 12 and 13. The caps 12 and 13 are removable. For this purpose, they may be a friction fit in the ends of the tube 10.

One end of the frame 10 is wheel-mounted by locating an axle 14 therein and providing wheels 15 journaled on the axle.

The axle 14 is removable relative to the frame 10 and is normally retained assembled relative to the frame by a cotter key 14ª. The cotter keys 15ª retain the wheels 15 in position and one of these of course must be removed in order to remove the axle 14 from the frame 10.

Adjacent the other end of the tube 10 a collar 16 is provided with ears 17 carrying a pivot pin 18. A pair of triangular lifting arms 19 are pivoted on the pin 18 and carry an axle 20. Wheels 21 are mounted on the axle 20.

Referring to Figure 8, a line V indicates the vertical and it will be noted that a line L drawn through the axes of the pivot pin 18 and the axle 20 is at an angle relative thereto. The angle of the line L is such that as the lifting arms swing about the pivot 18, it approaches the line V as in Figure 9 and finally passes it slightly as in Figure 10. This results in the possibility of having the pivot 18 located quite low when the parts are in the lowered position of Figure 8, yet the lifting arm can swing to a relatively high position and the pivot 18 will be raised, as in Figure 10. Thus, the various desired dimensions, such as the distance between the pin 18 and the axle 20, may be maintained for proper leverage during the operation of the jack and still there is possibility of considerable movement between the low and high extremes of the structure.

The foregoing described arrangement also lends itself well to a jack structure in which a removable hydraulic extension unit can be used. This unit includes a lifting cylinder 22, a lifting piston 23, a hollow piston rod 24 and pump mechanism located within the hollow piston rod 24 and having a pump piston rod 25 which can be operatively connected with a yoke 26.

The means of operative connection consists of a rack 27 (affixed to the pump piston rod 25 as by a pin 28) and a pinion 29. The pinion 29 is keyed to a shaft 30 which in turn is pinned to the yoke 26. Extending from the yoke 26 is a tubular handle 27ᶜ which is shown broken off in the drawings but would be of the usual length (about three feet) to give plenty of leverage for operating the pump mechanism without undue effort.

Opposite sides of the body member 10 are provided with axially extending slots 31. A lifting pin 32 extends through the slots and laterally through the body member. It is connected with the lifting arms 19 by links 33, having their ends encircling the lifting pin 32 and the axle 20.

A lifting saddle 34 is pivoted to the outer ends of the lifting arms 19 by a pin 35. The saddle 34 terminates in a head 36 for engagement with the axle being lifted. The head 36 is retained in a level position during the operation of the jack by parallelogram arms 37. The arms 37 are pivoted at 38 to the ears 17 of the collar 16 and to a pin 39 carried by the saddle 34.

The pump mechanism of my jack structure is shown in detail in Figure 4. It includes a piston head 40 on which the cup leather piston 23 is mounted, and in the head 40 inlet and outlet check valves of ball type are provided, as illustrated at 41 and 42. The ball 42 is constrained to engage its seat by a spring 43 while the ball 41 is constrained to engage its seat by gravity and by the flow of oil from the ball 42 toward a passageway 44 that the ball seats against. The ball 41 is retained against accidental dislodgment from a cavity 45 in the piston head 40 by plugs 46 having a packing washer 47 between them and a washer 48 having a plurality of fingers 49, as best shown in Figure 6. The washer 48 is retained in position by a gasket 50 and the hollow piston rod 24 which is screwed into the piston head 40.

The pump piston is indicated at 51. It is secured to the inner end of the pump piston rod 25 which has an extension 52. The extension 52 is adapted to engage the ball 41 and cause it to engage the ball 42 whereby both are unseated, as shown by dotted lines in Figure 4, when it is desirable to lower the jack.

The lifting piston rod 24 has a head 53 provided with a packing gland 54 for the piston rod 25. The head 53 acts as a thrust member against a pair of removable abutment pins 53ª which are normally retained against removal by the lifting arms 19, as shown in Figure 5. When the lifting arms are raised to the position shown by dash lines in Figure 10, by engaging the lifting head 36 and manually lifting it, then these pins can be removed for removal of the hydraulic extension unit, as will hereinafter be described.

The cylinder 22 is provided with a closed head 55 (adapted to abut against the lifting pin 32) and at its opposite end with a head 56. The heads 55 and 56 are of such size as to slidably fit within the body member 10, although the cylinder 22 may be of any desired size smaller than the cylinder, dependent upon the power needed for the jack. The head 56 is provided with a packing gland 57 for the lifting piston rod 24. Referring to Figure 7, it will be noted that the bottom of the rack 27 is shaped to fit against the interior surface of the body member 10 and maintain proper pitch relation to the pinion 29 thereby.

The cylinder 22 is provided with a plug 58 for the purpose of filling the cylinder with oil. It is filled with oil up to this point when the hydraulic extension unit is positioned vertically with the head 55 downwardly and the piston 23 at its downward limit of movement. This will leave sufficient air space in the unit to compensate for displacement of the piston rods 25 and 24 without creating excessive pressure or vacuum within the unit.

In Figures 11 to 16 I show modifications of Figures 1 to 10, wherein some of the parts are similar to those already described and accordingly bear the same reference numerals. Other parts are somewhat modified, as will now be described.

The shaft 20 is still carried by the lifting arms 19 but instead of having wheels like those shown at 21 in Figure 1 mounted thereon, they have brackets 20ª mounted thereon as shown particularly in Figure 16. The shaft 20 has at its ends reduced portions 20ᵇ extending through the lifting arms 19, and nuts 20ᶜ together with bushings 20ᵈ serve to secure the shaft 20 and the arms 19 together as a unit, with the brackets 20ª pivotally mounted on the bushings 20ᵈ.

The links 33 of Figure 1 have been lengthened for the structure shown in Figures 11 to 17 and are referred to as 33ª. They are pivotally mounted on the shaft 20 and their forwardly extending ends are fixed relative to the brackets 20ª. The manner of fixing them consists of a tie rod 33ᵇ having shouldered ends provided with nuts 33ᶜ and through hublike extensions 20ᵉ of the brackets 20ª.

The brackets 20ª have hubs 20ᶠ (preferably ball bearing) receiving swivel pins 21ª of swivel fittings 21ᵇ. The swivel fittings 21ᵇ carry spindles 21ᶜ on which the wheels 21 are journaled instead of being journaled on the shaft 20 itself, as shown in Figure 1.

Instead of having removable abutment pins as shown at 53ª in Figure 5, the form of invention shown in Figures 11 to 17 has stationary abutment pins or cap screws 53ᵇ. The pump piston rod 25 is connected by a removable pin 28ª to the rack member 27ª. A removable plug 28ᵇ permits access to the pin 28ª for removing it, whereupon the hydraulic extension unit may be removed from the back end of the jack instead of the front end after the axle 14 and the cap 12 have been removed (see Figure 2). This would also necessitate removal of the lifting pin 32 after one of the cotter pins 32ª thereof has been removed. Thus the extension unit may be removed through the forward end of the jack with the structure shown in Figure 1, or from the rear end with a structure as shown in Figure 12.

The rack 27ª shown in Figure 12 differs from the rack 27 shown in Figure 3 in that it has a portion 27ᵇ engaging the teeth of the pinion 29 at the top of the pinion, thus aiding in maintaining the pinion in proper pitch relation to the rack 27ª. In addition to the yoke 26ª, I provide a second yoke 26ᵇ which constitutes a foot pedal, so that the hydraulic extension unit can be operated by foot power, especially when it is desirable to quickly bring the unloaded jack up to position to engage the load. The foot pedal of course can only be depressed, and I therefore provide a return spring 25ᵇ on the pump piston rod 25 to effect return or upward movement of the foot pedal 26ᵇ when the foot pressure thereon is relieved.

The yoke 26ª has removably positioned therein a tubular elongated handle 27ᵈ retained in position by a clamp screw 26ᶜ. The yoke 26ª has a split hub 26ᵈ, as shown in Figure 13, to receive the handle 27ᵈ and permit rigid clamping thereof in position.

A variable element 60 serves as an operative connection between the foot pedal 26ᵇ and the hand operated lever 27ᵈ. The element 60 is slidable in the handle 27ᵈ and non-rotatable relative thereto. For this purpose the handle may be square or any desired shape other than round. A rod 61 having a coarse thread cooperates with the element 60 to effect longitudinal movement thereof upon rotation of the rod.

A cross arm 62 is provided for the handle 27ᵈ and is rotatable relative thereto. Bevel gears 63 serve to provide an operative connection between the cross arm 62 and the rod 61 whereby rotation of the cross arm will rotate the rod for adjustment purposes. A knurled wheel 64 is provided on the cross arm 62 to provide additional leverage for rotation of the cross arm.

The lower end of the varible element 60 is engageable with the cross member 26ᵉ of the foot pedal 26ᵇ so that various positions of the element 60 will permit motion of the lever 27ᵈ through various arcs to secure movement of the foot pedal 26ᵇ through a given arc and thus I am able to secure maximum oscillation of the pinion 29 from the lever 27ᵈ in various positions of the lever where there might be room for its operation.

Practical operation

My jack structure, it will be noted, is designed so that the lifting head 36 is exceptionally low (as in Figure 8) when in its lowered position. During the raising movement of the head, the wheels 21 approach the wheels 15 in such a manner as to impart a slight lift to the pivot 18 and interpose the long length of the arm 19 between the axes 20 and 35 under the article being elevated by the jack structure. This results in a very high lift (as shown in Figure 10), without excessively large or elongated parts.

During the raising of the jack, it will be obvious that any oscillation of the yoke 26 by the handle 27ᶜ will reciprocate the pump piston 51 and thereby pump oil through the check valves 41 and 42 from the cylinder 22 on the left of the piston 23 to the cylinder on the right of the piston. This effects an elongation of the hydraulic extension unit or a movement apart of the elements 53 and 55. Since the abutment pins 53ª are stationary with respect to the tubular body member 10, the flange or head 53 will engage them and the head 55 will move the lifting pin 32 along the slots 31. This pulls on the axle 20 so as to swing the lifting arms 19 about the pivot 18.

When it is desired to lower the jack, the yoke 26 is swung to its forwardmost position which causes the extension 52 of the pump piston rod 25 to open the check valves 41 and 42 as shown by dotted lines in Figure 4. The force exerted by a spring 31ª, the weight of the lifting arms and of the saddle 34 together with whatever might be supported by the head 36 then causes the lifting arm to swing back to lowered position, the speed being regulated by the degree of opening of the valve 42, which of course is under the control of the operator, by adjusting the yoke 26. The end of the extension 52, it will be noted, is cupped to aid in forcing the ball 41 off its seat and centering it against the ball 42 to effect opening of both balls in a simple and efficient manner. The spring 31ª insures contraction of the hydraulic extension unit during the lowering operation after the head 36 has receded from the load.

If anything goes wrong with the hydraulic extension unit, it can be readily removed and replaced with another one or returned to the factory for repairs and then readily reinserted. This is accomplished in the form of invention shown in Figures 1 to 10, by raising the lifting head 36 to the position shown by dash lines in Figure 10 and removing the pins 53a. Thereupon, after removing the end cap 13 and the pins that connect the yoke 26 with the shaft 30, the shaft can be removed from the pinion 29 and then the entire hydraulic unit pulled out of the end of the body member 10 normally closed by the cap 13. The sequence of operations just described is reversed for placing another unit in position and the jack in condition for operation.

Another way that the hydraulic extension unit can be removed is by removing the pin 28 (or 28ª, as shown in Figure 12) and then removing the axle 14 and the lifting pin 32 after removal of the cotter key 14ª, one of the cotter keys 15ª and one of the cotter keys 32ª. Thereupon the spring 31ª and the hydraulic extension unit may be removed from the back end of the jack (the cap 12 of course first being removed).

In connection with the form of invention shown particularly in Figures 11, 12, 15 and 16, the swivel axes of the castered wheels 21 are maintained substantially vertical throughout movement of the lifting arm between raised and lowered positions. By referring to Figures 8, 9 and 10, it will be seen that the lifting links 33 remain substantially at the same angle relative to the ground surface and accordingly by fixing the brackets 20ª relative to these links by the spaced rods 20 and 33ᵇ, the brackets 20ª remain in substantially the same positions relative to the ground surface. This eliminates undesirable tipping of the swiveled axes of the castered wheels which would result in improper caster operation when wheeling the jack from one position to another.

Having described specific embodiments of my jack structure and the operation thereof, I desire it to be understood that these forms are selected merely to facilitate the disclosure of the invention rather than to limit the details thereof. It is to be further understood that various modifications, adaptations and alterations may be applied to the specific forms disclosed to meet the requirements of practice without in any manner departing from the true spirit and purpose of the present invention.

I claim as my invention:

1. In a hydraulic jack structure, a tubular body, a shaft adjacent one end thereof, wheels journaled on said shaft, lifting arms pivoted to said body adjacent the other end thereof and located on opposite sides of said body, a shaft carried by said lifting arms, wheels carried by said last shaft and related to the pivot point of said arms to said body whereby said pivot point is lifted as said lifting arms swing from lowered toward raised position and means located within said tubular body for swinging said lifting arm about said pivot point.

2. In a hydraulic jack structure, an elongated body member wheel-mounted at one end, a lifting arm pivoted to said body member adjacent its opposite end, the pivotal point being located above the body member and the lifting arm in a lowered position being substantially parallel to the body member, the end of said lifting arm adjacent the pivot point of said arm to said body member being wheel-mounted with a line between the pivot axis and the axis of the wheel at an angle to the vertical whereby raising of the lifting arm causes such line to swing toward the vertical and thereby raise the pivot point and hydraulic means for imparting movement to said lifting arm to swing it relative to said body member.

3. In a hydraulic jack structure, an elongated body member wheel-mounted at one end, a lifting arm pivoted to said body member adjacent its opposite end, the pivotal point being located above the body member and the lifting arm in a lowered position being substantially parallel to the body member, the end of said lifting arm adjacent the pivot point of said arm to said body member being wheel-mounted with a line between the pivot axis and the axis of the wheel at an angle to the vertical and the wheel axis on the opposite side of the vertical from the lifting end of the lifting arm and hydraulic means for swinging said wheel axis toward the vertical to raise said lifting arm relative to said body member.

4. In a hydraulic jack structure, a tubular body member, a lifting arm pivoted thereto, said body member and lifting arm being wheel-mounted, an axially extending slot in the side of said body member, a lifting pin extending therethrough, an operative connection between said lifting pin and said lifting arm and a hydraulic unit within said body member and operative to move said lifting pin longitudinally of said slot to impart lifting movement to said lifting arm.

5. In a hydraulic jack structure, a tubular body member, a lifting arm pivoted thereto, said body member and lifting arm being wheel-mounted, an axially extending slot in the side of said body member, a lifting pin extending therethrough, a link connection between said lifting pin and said lifting arm, a hydraulic extension unit in said body member, said body member having an abutment, said hydraulic extension unit being located between said abutment and said lifting pin and including pump mechanism, and means pivoted to said body member and operatively connected with said pump mechanism to operate it to effect extension of said hydraulic extension unit.

6. In a jack structure, a tubular body member, a lifting arm pivoted thereto, an axially extending slot in the side of said body member, a lifting pin extending therethrough, a link connection between said lifting pin and said lifting arm, an extensible unit within said body member, said body member having a movable abutment pin, said extensible unit being located between said abutment pin and said lifting pin, means pivoted to said body member and operatively connected with said extensible unit to operate it to effect extension thereof, said abutment pin, when moved from normal position, permitting removal of said extensible unit from said tubular body member.

7. In a hydraulic jack structure, a hollow body member, a lifting arm pivoted to said body member, a hydraulic extension unit removably positioned in said body member, said body member having stationary means for said unit to abut against, a movable element engageable by said hydraulic extension unit upon extension thereof, an operative connection between said movable element and said lifting arm, said hydraulic extension unit including pump mechanism, and a handle pivoted to said body member and operatively connected with said pump mechanism to operate it to effect extension of said unit and thereby raising of said lifting arm.

8. In a hydraulic jack structure, a hollow body member, lifting arms on opposite sides thereof and pivoted thereto, said body member and lifting arms being wheel-mounted, openings in the sides of said body member, a lifting pin extending therethrough, link connections between the ends of said lifting pin and said lifting arms, a removable hydraulic extension unit in said body member, said hydraulic extension unit being operable to move said lifting pin along said slots and including pump mechanism, and a handle operatively connected with said pump mechanism to operate it to effect extension of said hydraulic extension unit.

9. In a hydraulic jack structure, a tubular body member, lifting arms on opposite sides thereof and pivoted thereto, said body member and lifting arms being wheel-mounted, axially extending slots in the sides of said body member, a lifting pin extending therethrough, link connections between the ends of said lifting pin and said lifting arms, a hydraulic extension unit in said body member, said body member having a pair of abutment pins, said hydraulic extension unit being located between said abutment pins and said lifting pin and including pump mechanism, and a handle pivoted to said body member and operatively connected with said pump mechanism to operate it to effect extension of said hydraulic extension unit, said abutment pins being confined against movement from their normal hydraulic extension unit confining position by said lifting arms during operation of the jack structure between normal limits, said lifting arms being manually movable independent of said handle to a position permitting movement of said abutment pins to non-confining position.

10. In a hydraulic jack structure, a tubular body member, a lifting arm pivoted thereto, an axially extending slot in the side of said body member, a lifting pin extending therethrough, an operative connection between said lifting pin and said lifting arm and a removable hydraulic unit within said body member and operative to move said lifting pin longitudinally of said slot to impart lifting movement to said lifting arm.

11. In a hydraulic jack structure, a tubular body member, a lifting arm pivoted thereto, an axially extending slot in the side of said body member, a lifting pin extending therethrough, a link connection between said lifting pin and said lifting arm, a hydraulic unit within said body member and operative to move said lifting pin longitudinally of said slot to impart lifting movement to said lifting arm, said hydraulic unit comprising a lifting cylinder, a piston rod and a pump mechanism, a handle pivoted to said body member and operatively connected with said pump mechanism and an abutment engagement between said hydraulic unit and said body member.

12. In a hydraulic jack structure, a tubular body member, a lifting arm pivoted thereto, said body member and lifting arm being wheel-mounted, an axially extending slot in the side of said body member, a lifting pin extending therethrough, a link connection between said lifting pin and said lifting arm, a removable hydraulic extension unit in the said body member, said body member having a movable abutment pin, said hydraulic extension unit being located between said abutment pin and said lifting pin, said abutment pin being movable to permit removal of said hydraulic extension unit only when said lifting arm is raised to a position above that possible by maximum extension of said hydraulic unit.

13. In a jack structure of the character disclosed, a body member, a lifting arm pivoted thereto, an axially extending slot in the side of said body member, a lifting pin extending therethrough, an operative connection between said lifting pin and said lifting arm, an extensible unit in said body member, said body member having a movable abutment, said extensible unit being located between said abutment and said lifting pin, said abutment being movable only when said lifting arm is raised to a position above that possible by maximum extension of said extensible unit and upon such movement permitting removal of said extensible unit from said body member.

14. In a hydraulic jack structure, a tubular body member, lifting arms pivoted on opposite sides thereof, shafts carried by said body member and said lifting arms, wheels on said shafts, axially extending slots in the sides of said body member, a lifting pin extending therethrough, link connections between said lifting pin and the shaft of said lifting arms, a hydraulically extensible unit in said body member, said body member having an abutment, said hydraulic extension unit being located between said abutment and said lifting pin, whereby extension of the pin will swing the shaft of said lifting arms about the pivot axis of said lifting arms to said body member.

15. In a hydraulic jack structure, an elongated frame, a wheel journaled on said frame adjacent one end thereof, a lifting arm pivoted on said frame adjacent the other end thereof, a wheel carried by said lifting arm and related to the pivot point of said arm to said frame whereby said pivot point is lifted as said lifting arm swings from lowered toward raised position, said last wheel being castered relative to said lifting arm, means for maintaining the swivel axis thereof substantially vertical during movement of the lifting arm between raised and lowered position and means for swinging said lifting arm about said pivot point.

16. In a hydraulic jack structure, a frame, a wheel journaled on said frame adjacent one end thereof, a lifting arm pivoted to said frame adjacent the other end thereof, a second wheel swivelly carried by said lifting arm and related to the pivot point of said arm to said frame whereby said pivot point is lifted as said lifting arm swings from lowered toward raised position, means for maintaining the swivel axis of said second wheel substantially vertical during movement of the lifting arm between raised and lowered position and means for swinging said lifting arm about said pivot point.

17. In a hydraulic jack structure, a frame, a wheel journaled thereon, a lifting arm pivoted to said frame, a wheel carried by said lifting arm, said last wheel being castered relative to said jack structure, means for swinging said lifting arm about said pivot point and including a link connected with said lifting arm and means for maintaining the swivel axis of said castered wheel substantially vertical during movement of the lifting arm between raised and lowered positions comprising a mounting bracket therefor connected with said link to rotate therewith relative to the lifting arm as it is raised and lowered.

18. In a hydraulic jack structure, a frame, a wheel journaled on said frame, a lifting arm pivoted to said frame, means for swinging said lifting arm about said pivot point and including an operating link connected therewith, a caster wheel carried by said lifting arm at a point spaced from the pivot point of said arm to said frame and means for maintaining the swivel axis of said caster wheel substantially vertical during movement of the lifting arm between raised and lowered position comprising a mounting bracket for the caster wheel connected with said link to rotate therewith and pivot relative to said lifting arm.

19. In a hydraulic jack structure, a wheel mounted frame, a lifting arm pivoted to said frame, hydraulic means for swinging said lifting arm about said pivot point, said hydraulic means including a pump, a stem extending therefrom, a foot pedal operatively connected with said stem to reciprocate the same upon oscillation of the foot pedal, a hand operated lever engageable with said foot pedal and including a variable element adapted to effect movement of said foot pedal through a predetermined path by movement of said hand operated lever in different paths determined by the position of said variable element relative to said hand operated lever and means for adjusting the position of said variable element comprising a rod threadedly connected therewith, a cross arm on said hand operated lever, said cross arm being rotatable, and an operative connection between said cross arm and said rod for rotating the rod upon rotation of the cross arm.

20. In a hydraulic jack structure, a tubular body member, a lifting arm pivoted thereto, said body member and lifting arm being wheel-mounted, an axially extending slot in the side of said body member, a lifting pin extending therethrough, an operative connection between said lifting pin and said lifting arm and a hydraulic unit within said body member and comprising a lifting cylinder, a lifting piston therein, a hollow piston rod connected with said lifting piston, an abutment on said body member, said cylinder and piston rod being interposed between said abutment and said lifting pin, pump means in said piston rod and operable to transfer liquid within said cylinder from one side of said piston to the other side thereof, and an operating lever pivoted to said body member and having a pinion therein, said pump means including a piston rod having a rack to coact with said pinion to effect reciprocation of said last piston rod upon oscillation of said operating lever.

21. In a hydraulic jack structure, a tubular body member, a lifting arm pivoted thereto, a lifting pin movable axially of said body member, an operative connection between said lifting pin and said lifting arm and a hydraulic unit within said body member and comprising a lifting cylinder, a lifting piston therein, a hollow piston rod connected with said lifting piston and extending from said cylinder, an abutment on said body member, said cylinder and piston rod being interposed between said abutment and said lifting pin, pump means in said piston rod and operable to transfer liquid within said cylinder from one side of said piston to the other side thereof, and an operating lever for said pump means.

22. In a jack structure, a body member, lifting arms pivoted thereto, said body member and lifting arms being wheel-mounted, axially extending slots in the sides of said body member, a lifting pin extending therethrough, an operative connection between the ends of said lifting pin and said lifting arms and an extensible unit within said body member and comprising telescoping parts, an abutment on said body member, said telescoping parts being interposed between said abutment and said lifting pin to effect extension of said telescoping parts, and an operating lever pivoted to said body member and having an operative connection with said telescoping parts to effect extension of said extensible unit upon oscillation of said operating lever.

23. In a hydraulic jack structure, a tubular body member, a lifting arm pivoted thereto, an axially extending slot in the side of said body member, a lifting pin extending therethrough, an operative connection between said lifting pin and said lifting arm and a removable hydraulic unit within said body member and operative to move said lifting pin longitudinally of said slot to impart lifting movement to said lifting arm.

24. In a hydraulic jack structure, a hollow body member, a lifting arm pivoted to said body member, a completely operable hydraulic extension unit removably positioned in said hollow body member, said body member having stationary means for said unit to abut against, a movable element engageable by said hydraulic extension unit upon extension thereof, an operative connection between said movable element and said lifting arm, said hydraulic extension unit including pump mechanism having a projecting operating stem, and means coacting with said stem for operating said pump mechanism to effect extension of said unit and thereby raising of said lifting arm.

25. In a hydraulic jack structure, an elongated body member wheel-mounted at one end, a lifting arm pivoted to said body member intermediate its ends, the pivotal point being located above the body member and the lifting arm in a lowered position being substantially parallel to the body member, the end of said lifting arm adjacent the pivot point of said arm to said body member being wheel-mounted with a line between the pivot axis and the axis of the wheel at an angle to the vertical and the wheel axis on the opposite side of the vertical from the lifting end of the lifting arm and hydraulic means for swinging said wheel axis toward the vertical to raise said lifting arm relative to said body member.

26. A lifting jack comprising a frame, a lifting arm pivotally mounted adjacent one end thereof on said frame, means to support an object on the other end of said lifting arm, means to movably support said first end of said lifting arm relative to the ground, power means on said frame, and means operatively connecting said power means to said lifting arm to rotate said lifting arm on its pivotal connection to said frame so as to raise said other end thereof while causing said first end thereof to move along the ground.

LEONARD D. NILSON.